Nov. 24, 1942.   J. BLACKBURN   2,303,108
CABLE RING OR HANGER
Filed June 20, 1941   2 Sheets-Sheet 1
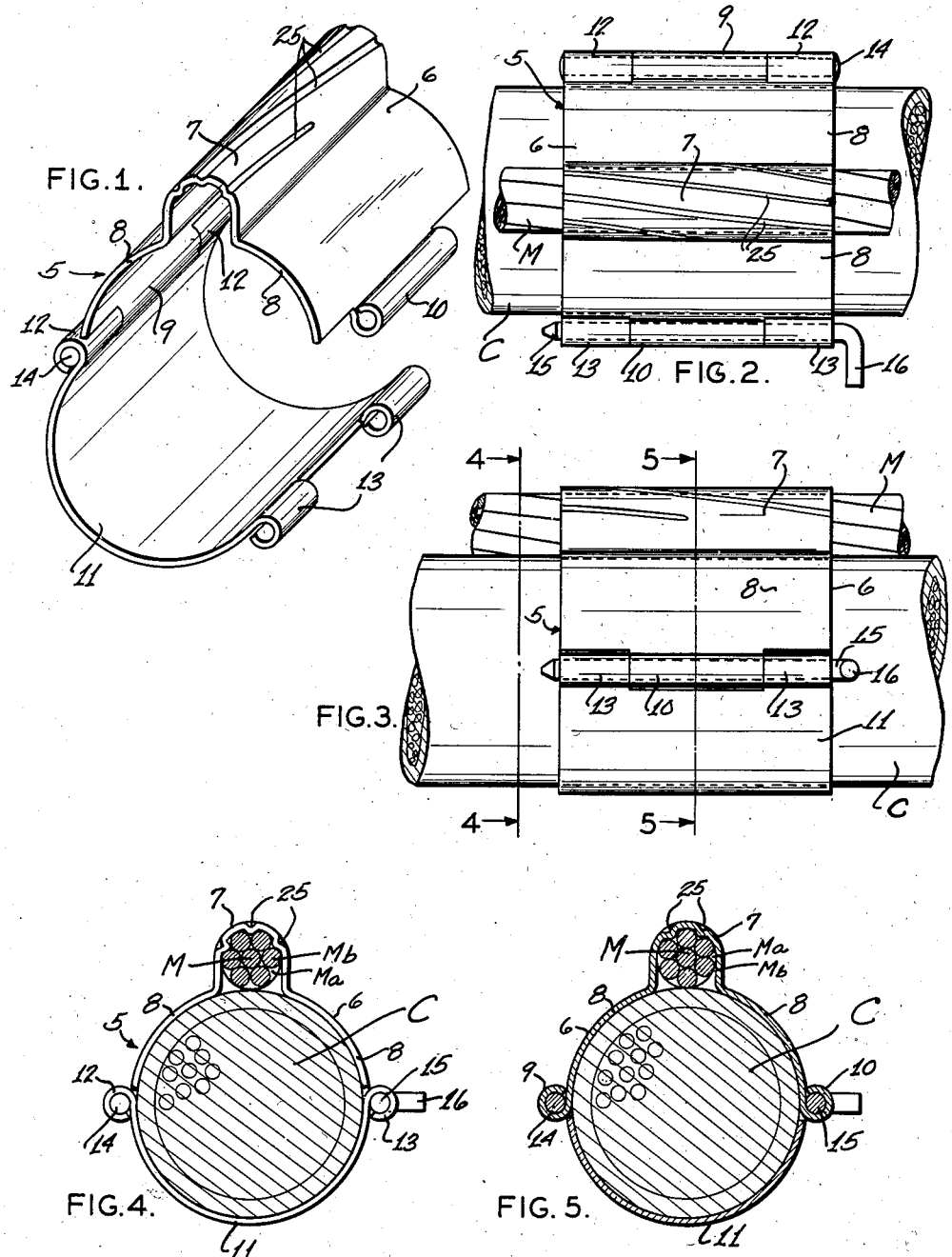

Nov. 24, 1942.    J. BLACKBURN    2,303,108
CABLE RING OR HANGER
Filed June 20, 1941    2 Sheets-Sheet 2

INVENTOR.
Jasper Blackburn
BY A. E. Fisher
ATTORNEY

Patented Nov. 24, 1942

2,303,108

UNITED STATES PATENT OFFICE 2,303,108

CABLE RING OR HANGER

Jasper Blackburn, Webster Groves, Mo.

Application June 20, 1941, Serial No. 398,903

4 Claims. (Cl. 248—61)

This invention relates to cable rings, hangers or supports, as conventionally used in telephone and telegraph installations, for supporting from the messenger wire as extended between the poles, the tubular cable in the form of a leaden sheath used for carrying the group or fascine of electrical conductors.

In ordinary practice with conventional forms of cable rings or hangers, the cable depends in a substantially spaced relation below the messenger wire and lies freely within the ring, which is considerably larger in diameter than the cable, with the result that under the action of the wind, the cable is caused to sway and roll within the ring. This frictional rolling action in time causes the ring to wear through the leaden sheath of the cable and through the conductor insulations or wrappings, so that the metallic ring directly contacts and cuts into the conductors themselves, with of course various injurious effects, such as short circuiting of the wires.

It is the prime object of the present invention therefore, to provide a form or forms of cable ring or hanger of the kind referred to, whereby the cable will be closely clamped below and in contact with the messenger wire for obviating independent swing of the cable, and which may be quickly mounted in place or removed.

Another object of the invention is to provide a practical and economical form or forms of cable ring or hanger for closely yoking the cable to the supporting messenger wire, thereby eliminating independent motion of the cable and the consequent wear thereon as caused by conventional forms of loose rings, with means included for readily assembling the device upon the cable and messenger wire, means for preventing the device from "creeping" on the messenger wire, and means for adjusting the device closely upon cables of varying diameters.

Another object of the invention is to provide, in a device of the kind described, an element for overlying a messenger wire, another element for underlying the cable and releasable means for closely locking the assembly together, with the messenger wire and cable in close contact.

With the stated objects in view, certain preferred embodiments of the invention are shown in the accompanying drawings, wherein:

Figure 1 is a perspective view of the hinged form of cable ring or hanger, showing the same opened, as for the reception of the cable and messenger wire.

Figure 2 is a top plan view of the hinged form of Figure 1, as operatively closed upon a cable and messenger wire, and releasably held in place by means of a removable locking key or pin.

Figure 3 is a side elevational view of the assembly of Figure 2.

Figure 4 is a transverse section on the line 4—4 of Figure 3.

Figure 5 is a transverse section on the line 5—5 of Figure 3.

Figure 6:
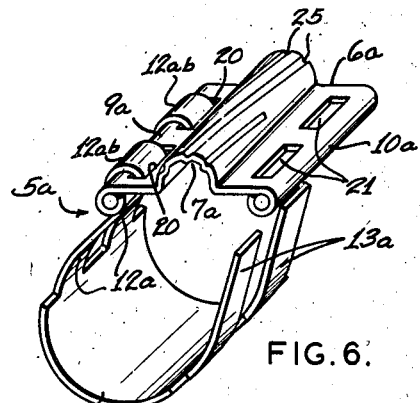
Figures 6, 7, 8 and 9 are views corresponding respectively to Figures 1, 2, 3 and 4, showing the adjustable lock form of the device.

These cable rings or hangers are designed for supporting a cable as represented at C, from a messenger wire as represented at M, the two being extended between telegraph or telephone poles (not shown) in conventional manner in such installations as referred to in the preamble. In such installations the messenger wire M is generally of the multi-strand, spirally twisted type, forming therearound a series of spiral, longitudinally extended flutes and fillets as indicated at Ma and Mb. The devices are all preferably formed of sheet metal, and as shown in Figures 1 to 5 representing the hinged form with removable locking key, the hanger represented generally at 5, comprises an upper, semi-circular messenger engaging shell 6, including a reduced, centrally extended, channel 7, arcuate in cross-section, for directly overlying the messenger wire M, and at either side thereof pendent side members or skirts 8 for partially embracing the cable C at each side thereof. A reduced or shortened hinge-sleeve 9 is turned at the lower end of one side member, and a similarly reduced lock-sleeve 10 is turned at the lower end of the opposite side member.

A similar semi-circular and complemental cable support or stirrup 11 is provided, the messenger engaging portion however being omitted of course, and is likewise formed at its ends with spaced marginal hinge-sleeves 12 at one side and with lock-sleeves 13 at the opposite end, the spaces between the same being dimensioned to nicely engage the hinge-sleeve 9 and the lock sleeve 10, respectively, of the messenger engaging shell 6. These two parts 6 and 11 are then dove-tailed together in the manner indicated, and a hinge-pin 14 is passed through the aligned hinge sleeves 9 and 12 and its ends upset to permanently anchor the pin in place. A similar locking pin 15 is provided for removable insertion through the aligned and dove-tailing lock-sleeves 10 and 13 of the elements at their opposite side, the pin 15 having a turned end 16 to serve as a handle.

In the use of this form of hanger, the same is opened to receive the messenger wire M and the cable C, the element 6 being positioned over the former and the element 11 under the latter. The device is then closed and locked with the pin 15 in the manner stated.

The parts are so formed and dimensioned as to press the messenger and cable closely together, when the device is locked thereon as described.

The modified and adjustable hinged form of hanger 5a, as shown in Figures 6 to 9, comprises a substantially flat messenger engaging element 6a formed with a central channel 7a for overlying the messenger M, and with marginal hinge and lock-sleeves 9a, 10a repsectively. The arcuate cable stirrup 11a is formed at its end margins with pairs of spaced hinge-tongues 12a and lock-tongues 13a.

Figure 7:
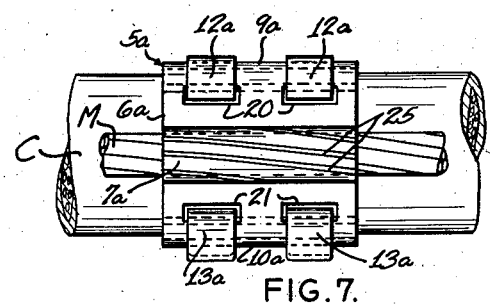
Figure 9:
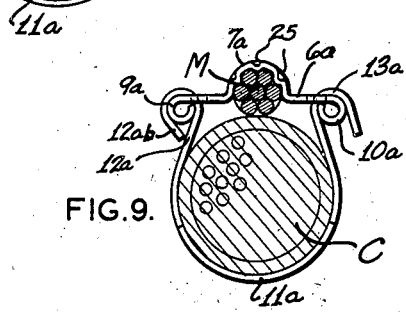
Figure 8:
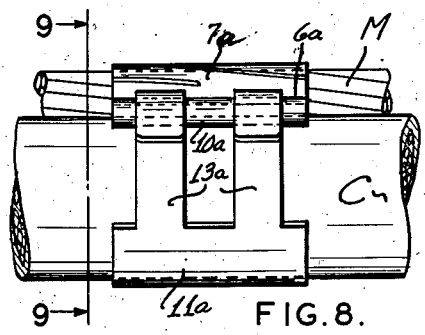
Figure 10:
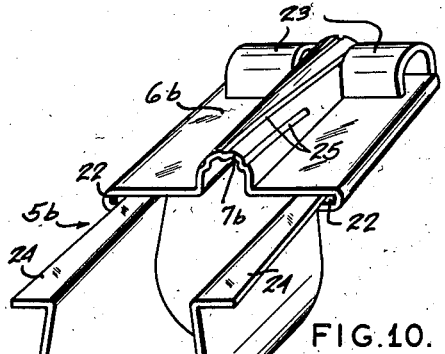
Figures 10, 11, 12 and 13 are views corresponding respectively to Figures 1, 2, 3 and 4, showing the tapered and slidable lock form of the device.

The hinge-tongues 12a are passed up through spaced hinge slots 20 formed in the element 6a inwardly of the hinge-sleeve 9a and are then turned outwardly, down over this sleeve as at 12ab to provide a hinge joint. Similarly spaced lock-slots 21 are formed in the opposite margin of the element 6a inwardly of the lock-sleeve 10a, and adapted to slidably engage the lock-tongues 13a, which may be bent outwardly and down over the lock sleeve 10a, at any adjusted position to lock the messenger and cable closely together, as shown in Figures 7 to 9. Thus this form of the device is well adapted for use with cables of different sizes.

Figure 11:
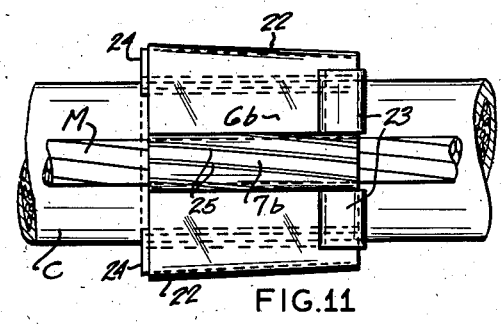
Figure 13:
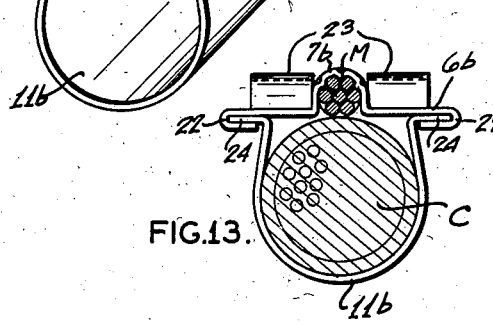
Figure 12:
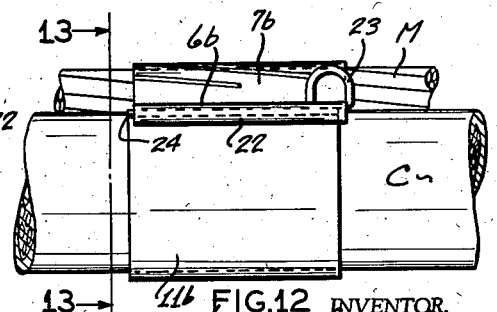

In the modified slidable lock form 5b of the hanger, as shown in Figures 11 to 13, the messenger engaging element 6b is also substantially flat, and formed with a central channel 7b for overlying the messenger M. However this element 6b is slightly tapered as shown, and has its lateral margins turned down and inward to form slide-ways 22. One end of this element is also rolled up and over to provide a finger-piece 23. The arcuate or semi-circular cable-stirrup 11b is extended well up at the sides, and the lateral margins thereof are turned flatly outward in a common plane to form slides 24, and these slides are tapered in their edges as shown, in the same direction and complementally to the taper of the element 6b.

The stirrup or cable ring 11b and slides 24 are of course dimensioned to co-act with the messenger engaging element 6b, and so that the slides 24 will nicely fit into the slide-ways 22.

With the element 6b properly located over the messenger wire M, and the cable C within the stirrup 11b, the elements are quickly locked closely together by sliding the element 11b onto the element 6b, where they are frictionally and removably interlocked, in the manner stated.

In order to prevent the devices as described from "creeping" upon or along the messenger wire or cable M, the inner walls or faces of the messenger engaging elements 6, 6a, 6b, may be corrugated or fluted spirally, as shown at 25 in all views, and thus adapted to intermesh with the spiral flutings and fillets M of the conventional type of messenger wire cables employed in practice.

As a matter of course the devices may be made of any desirable material, and in any desired sizes to meet requirements.

It is thought the construction and use of the invention in its several forms, will be well understood from the foregoing description.

While I have here shown and described certain specific forms of the invention, the structural features thereof may be modified within the scope of the claims.

I claim:

1. In a device of the kind described, for locking together in close contact a multi-strand, spirally twisted messenger wire forming superficial, spirally extended flutes and fillets and a cable, an element for partially embracing the cable at one side, and an element for partially embracing the messenger wire at the opposite side, the inner face of the messenger wire engaging element being spirally corrugated, complementally with the strands of the messenger wire to intermesh with the flutes and fillets thereof, whereby the device is locked against longitudinal movement on the inclosed messenger wire.

2. In a device according to claim 1, means for releasably locking the elements together upon the inclosed messenger wire and cable.

3. In a device of the kind described for releasably and adjustably clamping together a cable and a spirally fluted messenger wire an element for partially embracing the cable over one side thereof, an element for partially embracing the messenger wire over one side thereof oppositely to the first named element and formed on its inner face with spirally extended fillets for intermeshing engagement with the flutes of the messenger wire, for preventing creeping thereon, hinge connections for the two elements at one side, and means for adjustably locking the free margins of the elements together at the opposite side, to accommodate cables of various sizes.

4. In a device according to claim 3, the said adjustable locking means comprising flexible lock-tongues extended from the margin of one element and adapted to slidably engage lock-slots formed in the margin of the other element, whereby the tongues may be passed through the slots and bent down outwardly over the margins thereof for adjustably locking the elements upon the cable and messenger wire.

JASPER BLACKBURN.